United States Patent [19]
Henry

[11] 4,101,707
[45] Jul. 18, 1978

[54] HOMOGENEOUS MULTILAYER DIELECTRIC MIRROR AND METHOD OF MAKING SAME

[75] Inventor: Rodney D. Henry, Anaheim, Calif.

[73] Assignee: Rockwell International Corporation, El Segundo, Calif.

[21] Appl. No.: 784,394

[22] Filed: Apr. 4, 1977

[51] Int. Cl.² .......................... G02B 5/08; G02B 1/02; G02B 5/14; H01S 3/00
[52] U.S. Cl. ............................ 428/409; 156/614; 156/645; 156/667; 350/96.10; 427/126; 427/131; 427/292; 427/309; 427/419 A; 428/446; 428/539; 428/913
[58] Field of Search ............... 350/96 WG; 156/614, 156/645, 667; 428/409, 410, 426, 432, 446, 539, 913; 427/131, 126, 309, 292, 419 B, 419 C, 419 E, 444

[56] References Cited
U.S. PATENT DOCUMENTS

| | | | |
|---|---|---|---|
| 2,877,144 | 3/1959 | Iversen | 427/131 X |
| 3,347,703 | 10/1967 | Engelman et al. | 427/131 X |
| 3,645,788 | 2/1972 | Mee et al. | 156/614 |
| 3,830,654 | 8/1974 | Cho | 350/96 WG |
| 3,868,589 | 2/1975 | Wang | 350/96 WG |
| 3,973,828 | 8/1976 | Onoda et al. | 350/96 WG |
| 3,990,776 | 11/1976 | Tseng et al. | 350/96 WG |
| 3,995,936 | 12/1976 | Hepner et al. | 350/96 WG |
| 3,996,576 | 12/1976 | Bullock | 350/96 WG |
| 3,997,241 | 12/1976 | Nishida et al. | 350/96 WG |
| 4,040,890 | 8/1977 | Burrus et al. | 350/96 WG |
| 4,056,304 | 11/1977 | Phillips | 350/96 WG |
| 4,056,654 | 11/1977 | Kompanek | 428/409 |
| 4,060,448 | 11/1977 | Nemiroff et al. | 427/131 X |
| 4,061,584 | 12/1977 | Girard et al. | 427/126 X |
| 4,065,743 | 12/1977 | Wahlers et al. | 427/126 X |

OTHER PUBLICATIONS

Tseng et al., "Mode Conversion etc", Applied Physics Letters, vol. 24, No. 6, Mar. 15, 1974, pp. 265–267.
Tien, et al., "Switching & Modulation etc", Applied Physics Letters, vol. 21, No. 8, Oct. 15, 1972, pp. 394–396.

Primary Examiner—Harold Ansher
Attorney, Agent, or Firm—H. Fredrick Hamann; G. Donald Weber, Jr.; Gilbert H. Friedman

[57] ABSTRACT

A multilayer dielectric mirror wherein the mirror substrate is of garnet. Chemical-mechanical final polishing of the substrate provides a surface relatively free of inhomogeneous strain for the deposition thereon of relatively homogeneous individual layers for a multilayer dielectric mirror coating.

3 Claims, 1 Drawing Figure

U.S. Patent  July 18, 1978  4,101,707
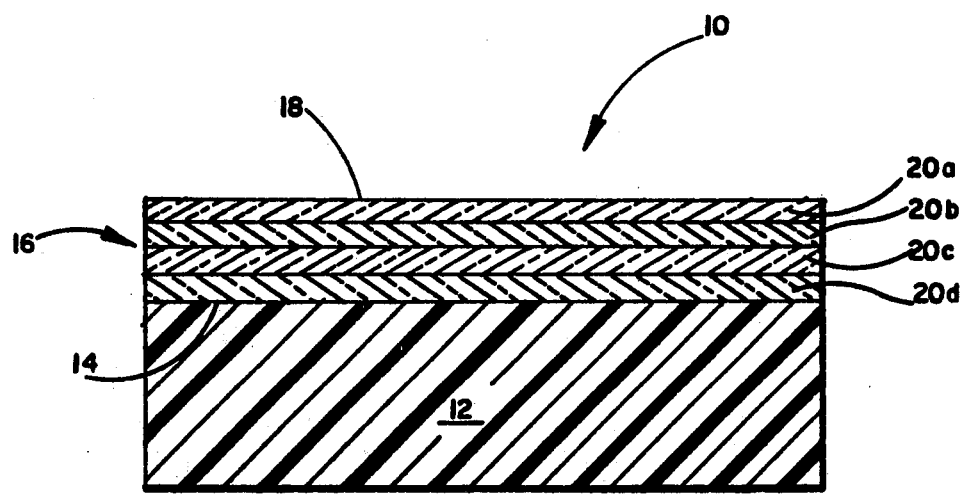

HOMOGENEOUS MULTILAYER DIELECTRIC MIRROR AND METHOD OF MAKING SAME

BACKGROUND OF THE INVENTION

1. Field of the Invention

The present invention relates to multilayer dielectric mirrors and, more particularly pertains to a new and improved multilayer dielectric laser mirror having a garnet substrate and a method for making such a mirror.

2. Description of the Prior Art

Multilayer dielectric mirrors have long been used in lasers and for other applications because of their high reflectivity. Commonly, such mirrors have included a substrate of fused silica or glass. A mirror coating comprising a plurality of layers of selected dielectric materials is deposited on a polished surface of the substrate. Mirror substrates of fused silica or glass have most commonly been polished by optical (or mechanical) polishing techniques.

Inhomogenities in the dielectric layers of the mirror coating on such prior art laser mirrors have caused difficulties in some applications. For example, a cause of phase locking in ring laser gyros is believed to be back scattering from inhomogeneities in the laser mirrors used in these gyros.

Garnet substrates such as those which are discussed hereinafter are known and have been used, for example, in magnetic bubble memories. The polishing of these garnet substrates by chemical-mechanical techniques is well known to those skilled in the art.

SUMMARY OF THE INVENTION

This invention provides a multilayer dielectric laser mirror wherein homogeneity of individual dielectric layers of a mirror coating is greatly improved over that of the prior art. The improvement results from the use of a mirror substrate of garnet. The surface of the garnet substrate on which the mirror coating is deposited is preferably final polished by chemical-mechanical polished techniques. A surface of a garnet substrate subjected to chemical-mechanical polishing is relatively free of inhomogeneous strain. It has been discovered that the equivalent mean surface roughness of the mirror coatings deposited on polished garnet surfaces free of inhomogeneous strain is significantly reduced from that of mirror coatings deposited on prior art polished fused silica or glass substrates.

BRIEF DESCRIPTION OF THE DRAWINGS

The sole FIGURE is a cross-sectional schematic view of a portion of a multilayer dielectric mirror.

DESCRIPTION OF THE PREFERRED EMBODIMENT

The Figure shows a portion of a multilayer dielectric mirror 10 having a substrate 12 fabricated of a suitable garnet. The substrate 12 typically comprises a monocrystalline non-magnetic garnet. As used here, the term "non-magnetic garnet" refers to garnet materials containing no more than an insignificant amount of iron. However, magnetic garnets may also be used in practicing this invention. The non-magnetic garnets are considered to be metal oxides designated by the general formula $J_3Q_5O_{12}$, where J is at least one element selected from the lanthanide series of the Periodic Table, lanthanum, yttrium, magnesium, calcium, strontium, barium, lead, cadmium, lithium, sodium, and potassium. The Q constituent is at least one element selected from gallium, indium, scandium, titanium, vanadium, chromium, manganese, rhodium, zirconium, hafnium, molybdenum, niobium, tantalum, tungsten and aluminum. Reference is made to U.S. Pat. Nos. 3,645,787 and 3,645,788 by Mee et al which are incorporated herein for a more detailed description of materials of the type noted.

The substrate 12 has a substantially rectangular cross-section. One surface of the substrate 12 is a polished surface 14 upon which is deposited the mirror coating 16. The mirror coating 16 comprises a plurality of individual layers $20a - 20d$ of selected non-magnetic dielectric materials cumulatively deposited in a stacked relationship, one upon the other. The individual layers $20a - 20d$ are deposited coatings of such dielectric materials as titanium dioxide, magnesium fluoride, silicon dioxide, or other non-mangetic dielectric materials suitable for this purpose. Different dielectric materials are selected to provide layers of a first dielectric material having a relatively higher index of refraction alternating with, or interleaved with, layers of a second dielectric material having a relatively lower index of refraction. The physical thickness of individual layers $20a - 20d$ within the mirror coating 16 is controlled to provide desired characteristics of the mirror 10 for various wavelengths of radiation which impinge on coating 16. The design and fabrication of such mirror coatings 16 is well known to those skilled in the art.

The optical thickness of an individual layer within the mirror coating 16 is given by the equation:

$$\delta = knh$$

where $\delta$ is the optical thickness, $k$ is the wavevector, $n$ is the index of refraction, and $h$ is the physical thickness.

It has been discovered that residual inhomogeneous strain in the polished surfaces of prior art fused silica or glass substrates produces thickness inhomogeneities in the layers of prior art multilayer dielectric mirror coatings which are subsequently deposited on the substrates. The residual strain is believed to result from the mechanical polishing techniques commonly used for these substrates. The resulting strain field induces the above-mentioned inhomogeneities in the subsequently deposited dielectric layers in the form of variations within a layer of both physical thickness and index of refraction. Measurements taken on sample prior art multilayer dielectric mirrors indicate that a mirror coating surface roughness of about 500 to about 1000 angstroms due to physical thickness inhomogeneities and up to about ten microns due to optical thickness inhomogeneities is common.

In the present invention, a polished surface 14 of garnet substrate 12 is provided for the deposition thereon of a multilayer dielectric mirror coating 16. In the preferred embodiment of the invention, the garnet surface 14 is final polished by standard chemical-mechanical polishing techniques known to be useful for preparing silicon and garnet substrates for epitaxial deposition thereon. These techniques are discussed in "Mechanical Preparation of $Gd_3Ga_5O_{12}$ and Various Electronic Materials by Vibratory Polishing Techniques", D. Medellin et al, *Metallographic Specimen Preparation,* Plenum Press, New York, 1974, p. 143. In the chemical-mechanical polishing of garnet, the pH of an abrasive slurry is adjusted by the addition thereto of an etchant. Certain gadolinium gallium garnet samples have been successfully polished with the pH of the abrasive slurry adjusted to a pH of 1.2 by using phosphoric acid. Strained material is preferentially removed by the etchant thereby leaving the polished surface relatively free of inhomogeneous strain. When a dielectric mirror coating 16 is subsequently deposited on the polished garnet substrate surface 14, the surface roughness due to physical thickness inhomogeneity of the mirror coating surface 18 is reduced to significantly less than 100 angstroms and no appreciable optical thickness inhomogeneity resulting from index of refraction variation occurs.

Having thus described a preferred embodiment of invention, what is claimed is:

1. A multilayer dielectric laser mirror comprising:
   a garnet substrate having a substantially rectangular cross-section wherein at least one side of said substrate is a mirror surface chemical-mechanical polished to be relatively free of inhomogeneous strain and wherein said garnet is a metal oxide having the general formula $J_3Q_5O_{12}$ wherein O is oxygen, J is at least one element selected from the group consisting of the lanthanide series of the Periodic Table, lanthanum, yttrium, magnesium, calcium, strontium, barium, lead, cadmium, lithium, sodium, and potassium, and Q is at least one element selected from the group consisting of gallium, indium, scandium, titanium, vanadium, chromium, manganese, rhodium, zirconium, hafnium, molybdenum, niobium, tantalum, tungsten, and aluminum; and
   a mirror coating deposited on said mirror surface of said substrate, said mirror coating consisting of a first plurality of layers of a first non-magnetic dielectric material having a relatively higher index of refraction and a second plurality of layers of a second non-magnetic dielectric material having a relatively lower index of refraction wherein said layers of said first dielectric material are interleaved alternately with said layers of said second dielectric material in a stacked relationship relative to each other and relative to said mirror, and wherein said first and second dielectric materials are selected from the group consisting of titanium dioxide, magnesium fluoride, and silicon dioxide.

2. A mirror as recited in claim 1 wherein said plurality of layers have a mirror coating surface roughness due to physical thickness inhomogeneity of less than 100 angstroms.

3. A method of forming a multilayer dielectric laser mirror which comprises:
   providing a garnet substrate having a substantially rectangular cross-section;
   polishing a selected side of said substrate to form a mirror surface thereon;
   providing an abrasive slurry;
   adjusting the pH of said abrasive slurry by the addition thereto of an etchant for said garnet;
   final polishing said mirror surface of said garnet substrate using said pH-adjusted abrasive slurry; and
   depositing a mirror coating on said mirror surface of said substrate, said mirror coating consisting of a first plurality of layers of a first non-magnetic dielectric material having a relatively higher index of refraction and a second plurality of layers of a second non-magnetic dielectric material having a relatively lower index of refraction wherein said layers of said first dielectric material are interleaved alternately with said layers of said second dielectric material in a stacked relationship relative to each other and relative to said mirror surface.

* * * * *